(12) United States Patent
Willnauer (10) Patent No.: US 10,891,165 B2
(45) Date of Patent: Jan. 12, 2021

(54) FROZEN INDICES

(71) Applicant: Elasticsearch B.V., Mountain View, CA (US)

(72) Inventor: Simon Daniel Willnauer, Berlin (DE)

(73) Assignee: Elasticsearch B.V., Mountain View, CA (US)

( * ) Notice: Subject to any disclaimer, the term of this patent is extended or adjusted under 35 U.S.C. 154(b) by 24 days.

(21) Appl. No.: 16/383,562

(22) Filed: Apr. 12, 2019

(65) Prior Publication Data

US 2020/0326986 A1   Oct. 15, 2020

(51) Int. Cl.
*G06F 9/50* (2006.01)
*G06F 9/54* (2006.01)
*H04L 29/08* (2006.01)

(52) U.S. Cl.
CPC ........... *G06F 9/5038* (2013.01); *G06F 9/546* (2013.01); *H04L 67/325* (2013.01); *G06F 2209/5011* (2013.01); *G06F 2209/5018* (2013.01)

(58) Field of Classification Search
CPC .................................................. G06F 9/5038
See application file for complete search history.

(56) References Cited

U.S. PATENT DOCUMENTS

| 8,615,794 | B1 | 12/2013 | Tomilson et al. |
| 8,898,261 | B1 | 11/2014 | Patsenker et al. |
| 9,734,180 | B1 | 8/2017 | Graham et al. |
| 10,541,983 | B1* | 1/2020 | Khashei Varnamkhasti ............... H04L 9/0643 |
| 2005/0114397 | A1 | 5/2005 | Doshi et al. |
| 2012/0233118 | A1 | 9/2012 | Holt et al. |
| 2012/0233299 | A1 | 9/2012 | Attanasio et al. |
| 2013/0086039 | A1 | 4/2013 | Salch et al. |
| 2013/0297469 | A1 | 11/2013 | Spittle et al. |
| 2014/0279871 | A1* | 9/2014 | Ochoa ................. G06F 16/273 707/610 |
| 2017/0024453 | A1 | 1/2017 | Raja et al. |
| 2017/0371926 | A1 | 12/2017 | Shiran et al. |
| 2018/0268000 | A1* | 9/2018 | McManus ......... G06F 16/24561 |
| 2019/0026336 | A1 | 1/2019 | Tian |

(Continued)

FOREIGN PATENT DOCUMENTS

| CN | 106934062 A | 7/2017 |
| WO | WO2020131330 A1 | 6/2020 |

OTHER PUBLICATIONS

Willnauer, Simon Daniel, "Frozen Indices," U.S. Appl. No. 16/383,562, filed Apr. 12, 2019, Specification, Claims, Abstract, and Drawings, 50 pages.

(Continued)

*Primary Examiner* — Sisley N Kim
(74) *Attorney, Agent, or Firm* — Carr & Ferrell LLP (57) ABSTRACT

Methods and systems for searching a frozen index are provided. Exemplary methods include: a method may comprise: receiving an initial search and a subsequent search; loading the initial search and the subsequent search into a throttled thread pool, the throttled thread pool including; getting the initial search from the throttled thread pool; storing a first shard from a mass storage in a memory in response to the initial search; performing the initial search on the first shard; providing first top search result scores from the initial search; and removing the first shard from the memory when the initial search is completed.

20 Claims, 7 Drawing Sheets

(56) References Cited

U.S. PATENT DOCUMENTS

| | | |
|---|---|---|
| 2019/0266271 A1 | 8/2019 | Leau |
| 2020/0050612 A1* | 2/2020 | Bhattacharjee ....... G06F 16/283 |
| 2020/0084213 A1* | 3/2020 | Taropa ................ G06F 16/3322 |
| 2020/0133550 A1 | 4/2020 | Willnauer |
| 2020/0176098 A1* | 6/2020 | Lucas .................... G16H 15/00 |
| 2020/0201879 A1 | 6/2020 | Leskes |
| 2020/0328936 A1 | 10/2020 | Perez-Aradros Herce et al. |
| 2020/0348878 A1 | 11/2020 | Leskes |

OTHER PUBLICATIONS

"International Search Report" and "Written Opinion of the International Searching Authority," Patent Cooperation Treaty Application No. PCT/US2019/063437, dated Feb. 7, 2020, 8 pages.

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Willnauer, Daniel, "Shard Splitting," U.S. Appl. No. 16/176,956, filed Oct. 31, 2018, Specification, Claims, Abstract, and Drawings, 47 pages.

Leskes, Boaz, "Cross Cluster Replication," U.S. Appl. No. 16/229,847, filed Dec. 21, 2018, Specification, Claims, Abstract, and Drawings, 53 pages.

Makwarth et al., "Distributed Tracing for Application Performance Monitoring," U.S. Appl. No. 16/381,997, filed Apr. 11, 2019, Specification, Claims, Abstract, and Drawings, 43 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

\* cited by examiner

FROZEN INDICES

FIELD OF THE INVENTION

The present technology pertains to organized collections of information and more specifically to resource management for organized collections of information.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data communications networks can be used for a distributed application structure that divides tasks between the providers of a resource or service, called servers, and service requesters, called clients. A server host runs one or more server programs, which share their resources with clients. A client does not necessarily share any of its resources, but requests a server's content or service function. Clients initiate communication sessions with servers which await incoming requests.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various methods and systems for searching a frozen index. Specifically, a method for searching a frozen index may comprise: receiving an initial search and a subsequent search; loading the initial search and the subsequent search into a throttled thread pool, the throttled thread pool including a first-in first-out queue; getting the initial search from the throttled thread pool; storing a first shard from a mass storage in a memory in response to the initial search; performing the initial search on the first shard; providing first top search result scores from the initial search; removing the first shard from the memory when the initial search is completed; getting the subsequent search from the throttled thread pool; storing a second shard from the mass storage in the memory in response to the subsequent search; performing the subsequent search on the second shard; providing second top search result scores from the subsequent search; and removing the second shard from memory when the subsequent search is completed.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Figure 1:
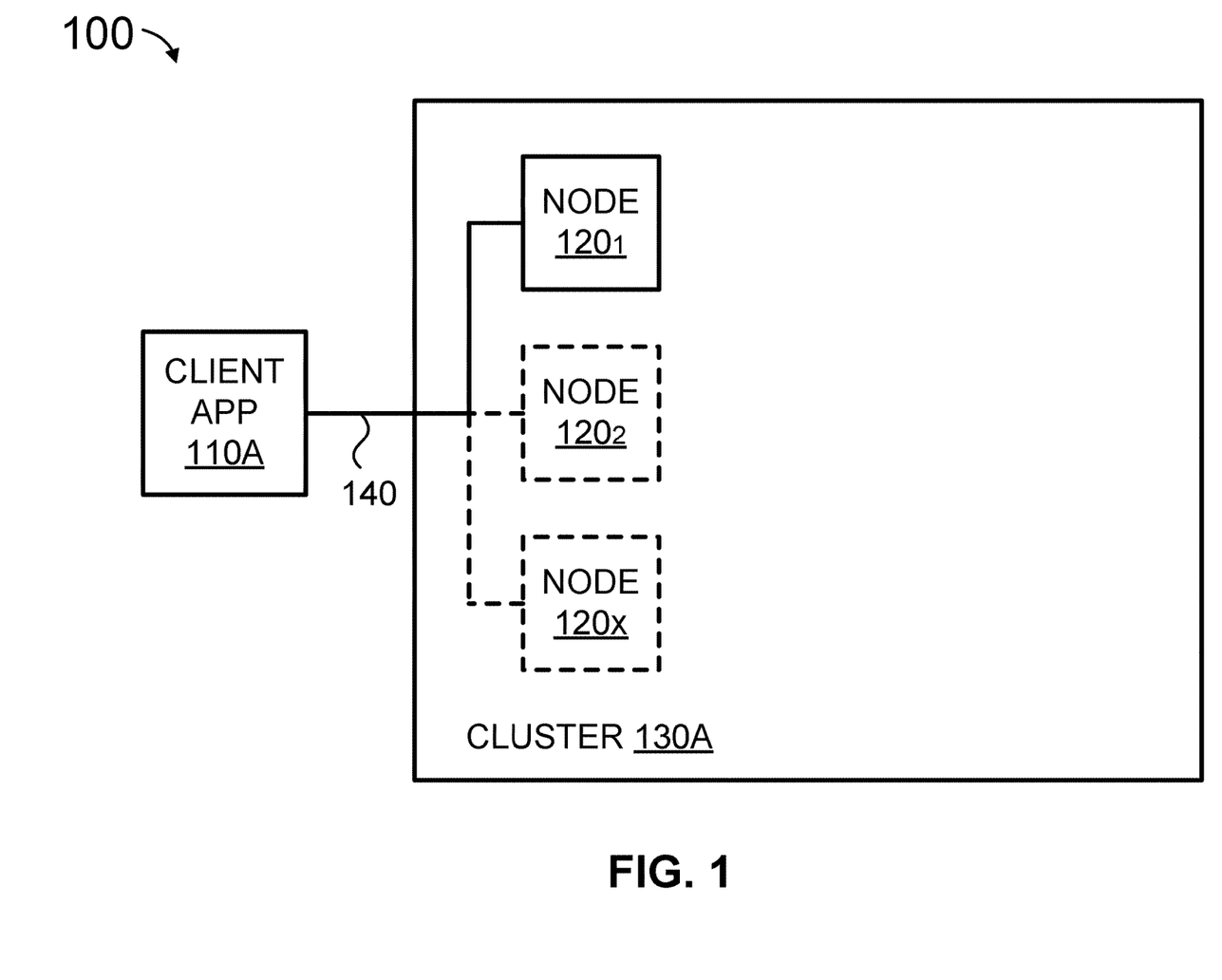
FIG. 1 is a simplified block diagram of a system having a distributed application structure, according to some embodiments.

FIG. 1 shows system 100 having a distributed application structure, according to some embodiments. System 100 includes client application 110A, one or more nodes $120_1$-$120_X$, and connections 140. Collectively, one or more nodes $120_1$-$120_X$ form cluster 130A. When only one node (e.g., node $120_1$) is running, then cluster 130A is just one node.

In various embodiments, a cluster (e.g., cluster 130A) is a collection of one or more nodes (servers) (e.g., one or more nodes $120_1$-$120_X$) that together store data and provides federated indexing and search capabilities across all nodes. A cluster can be identified by a unique name, such that a node can be part of a cluster when the node is set up to join the cluster by its name. A cluster may have only one node in it.

In some embodiments, a node (e.g., one or more nodes $120_1$-$120_X$) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster.

An index (not depicted in FIG. 1) is a collection of documents that have somewhat similar characteristics, according to various embodiments. For example, you can have an index for customer data, another index for a product catalog, and yet another index for order data. An index is identified by a name and this name is used to refer to the index when performing indexing, search, update, and delete operations against the documents in the index. A document (not depicted in FIG. 1) is a basic unit of information that can be indexed, according to some embodiments. For example, you can have a document for a single customer, another document for a single product, and yet another for a single order. An index can potentially store a large amount of data that can exceed the hardware limits of a single node. For example, a single index of a billion documents taking up 1 TB of disk space may not fit on the disk of a single node or may be too slow to serve search requests from a single node alone. An index can be subdivided into multiple pieces called shards. Subdividing an index into shards can be referred to as "sharding." Each shard can be a fully-functional and independent "index" that can be hosted on any node (e.g., one or more nodes $120_1$-$120_X$) in the cluster. For example, sharding can offer the benefits of horizontally splitting/scaling content, and distributing and parallelizing operations across shards (and potentially multiple nodes) to increase performance/throughput.

In some embodiments, at least one application programming interface (API) can be used to communicate with a cluster (e.g., cluster 130A). An API can include a set of subroutine definitions and protocols. For example, a node client and/or a transport client can be used be used to communicate with nodes (e.g., one or more nodes $120_1$-$120_X$) in a cluster. A node client joins a local cluster as a non-data node, which doesn't hold any data itself, but knows what data lives on which node in the cluster, and can forward requests directly to the correct node. The transport client can be used to send requests to a remote cluster. It doesn't join the cluster itself, but simply forwards requests to a node in the cluster. Other APIs, such as the RESTful API, can be used. Various languages (e.g., Groovy, JavaScript, .NET, PHP, Perl, Python, Ruby, and the like) can be used to communicate with a cluster using the RESTful API In some embodiments, nodes (e.g., one or more nodes $120_1$-$120_X$) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client application 110A) requests to the appropriate node. Each node can serve one or more purposes, master node and data node.

A master node can perform such cluster-wide actions as creating and/or deleting an index, tracking which nodes (e.g., one or more nodes $120_1$-$120_X$) are part of the cluster (e.g., cluster 130A), and deciding which shards to allocate to which nodes. Data nodes can hold shards that contain documents that have been indexed. Data nodes can handle data related operations such as create, read, update, and delete (operations that are used to administer persistent data storage; also referred to as CRUD), search, and aggregations. Ingest nodes can apply an ingest pipeline (e.g., a definition of a series of processors) to a document in order to transform and enrich the document before indexing. A tribe node can connect to multiple clusters and perform search and other operations across all connected clusters.

Each of client application 110A and one or more nodes $120_1$-$120_X$ can be a physical computing system, virtual machine, container, and the like. Generally, client application 110A can run on the same or different physical computing system, virtual machine, container, and the like as each of one or more nodes $120_1$-$120_X$. Each of one or more nodes $120_1$-$120_X$ can run on the same or different physical computing system, virtual machine, container, and the like as the others of one or more nodes $120_1$-$120_X$. A physical computing system is described further in relation to the exemplary computer system 700 of FIG. 7.

In some embodiments, virtual machines provide a substitute for a physical computing system and the functionality needed to execute entire operating systems. Virtual machines are created and run by a hypervisor which uses native execution to share and manage hardware, allowing for multiple environments which are isolated from one another, yet can exist on the same physical computing system.

In various embodiments, containers are an operating system-level virtualization method for deploying and running distributed applications without launching an entire virtual machine for each application. Containers can look like real computers from the point of view of programs running in them. Generally, a computer program running on an operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

When client application 110A runs on a different physical server from a node (e.g., of one or more nodes $120_1$-$120_X$), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes $120_1$-$120_X$) runs on a different physical computing system from another node (of one or more nodes $120_1$-$120_X$), connections 140 can be a data communications network.

Figure 2:
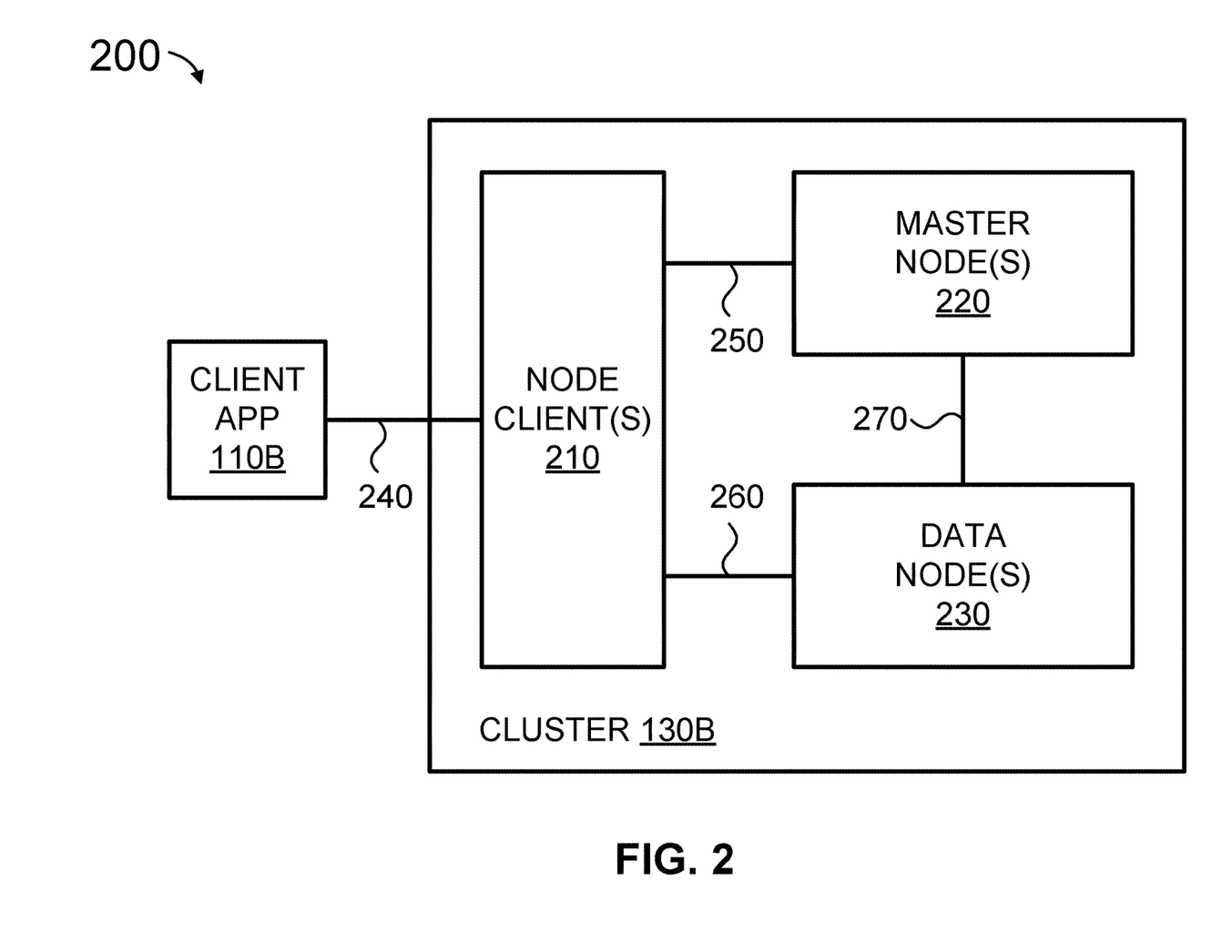
FIG. 2 is a simplified block diagram with a detailed view of a cluster, according to various embodiments.

FIG. 2 shows system 200 having a distributed application structure, according to some embodiments. System 200 can include client application 110B and cluster 130B. Client application 110E and cluster 130B can communicate with each other using communications network 240. Communications network 240 can include various combinations and permutations of wired and wireless networks such as the Internet, local area networks (LAN), metropolitan area networks (MAN), wide area networks (WAN), and the like using Ethernet, Wi-Fi, cellular networks, and the like. Client application 110B and cluster 130B can each have at least some of the characteristics described above in relation to client application 110A and cluster 130A (including one or more nodes $120_1$-$120_X$) in FIG. 1, respectively. Cluster 130B can include node client(s) 210, master node(s) 220, and data node(s) 230. Node clients, master nodes, and data nodes were described above in relation to FIG. 1.

According to some embodiments, the distributed application is a distributed, multitenant-capable full-text search engine, such as Elasticsearch. Elasticsearch is designed to store, retrieve, and manage document-oriented or semi-structured data. As described above, an index is a collection of documents that can have somewhat similar characteristics and a document is a basic unit of information that can be indexed. An index can potentially store a large amount of data that can exceed the hardware limits of a single node (e.g., data node(s) 230 and one or more nodes 120$_1$-120$_X$ (FIG. 1)).

In various embodiments, connections 240-270 can each include the same or different data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). For example, client application 110E can send an indexing and/or search request to node client(s) 210, and receive an indexing and/or search response from node client(s) 210 via connections 240. By way of further non-limiting example, node client(s) 210 can coordinate cluster state and metadata with master node(s) 220 via connections 250. By way of additional non-limiting example, node client(s) 210 can forward indexing and/or search requests to data node(s) 230A, and receive an indexing and/or search response from data node(s) 230A via connections 260. By way of further non-limiting example, master node(s) 220 can coordinate cluster state and metadata with data node(s) 230A via connections 270.

Some indexing and/or search requests can involve data held on different data nodes (e.g., data node(s) 230). These requests can be coordinated by the node that receives the client request, called a coordinating node. The coordinating node can also be referred to as the coordinator. For example, a search request can be executed in two phases by the coordinating node. In the scatter phase, the coordinating node forwards the request to the data nodes (e.g., data node(s) 230) that hold the data. Each of the data nodes executes the request locally and returns its results to the coordinating node.

In the gather phase, the coordinating node sorts the documents using criteria (e.g., each document's score) and reduces each data node's results into a single global set of results. For example, the top or best results from all the data nodes are collected into one set of results. In contrast to a conventional database—which delivers all results that match search criteria—search engines, such as Elasticsearch, deliver a (predetermined) number of the top or best results. For example, results from a search engine have a score which indicates how relevant that result (e.g., document) is for a given query. Documents with higher relevance can receive a higher score (or lower score depending on how relevancy is calculated). The results (e.g., documents) can be ranked according to their respective score and a (predetermined) number of documents having the best scores can be provided in response to the query.

Figure 3:
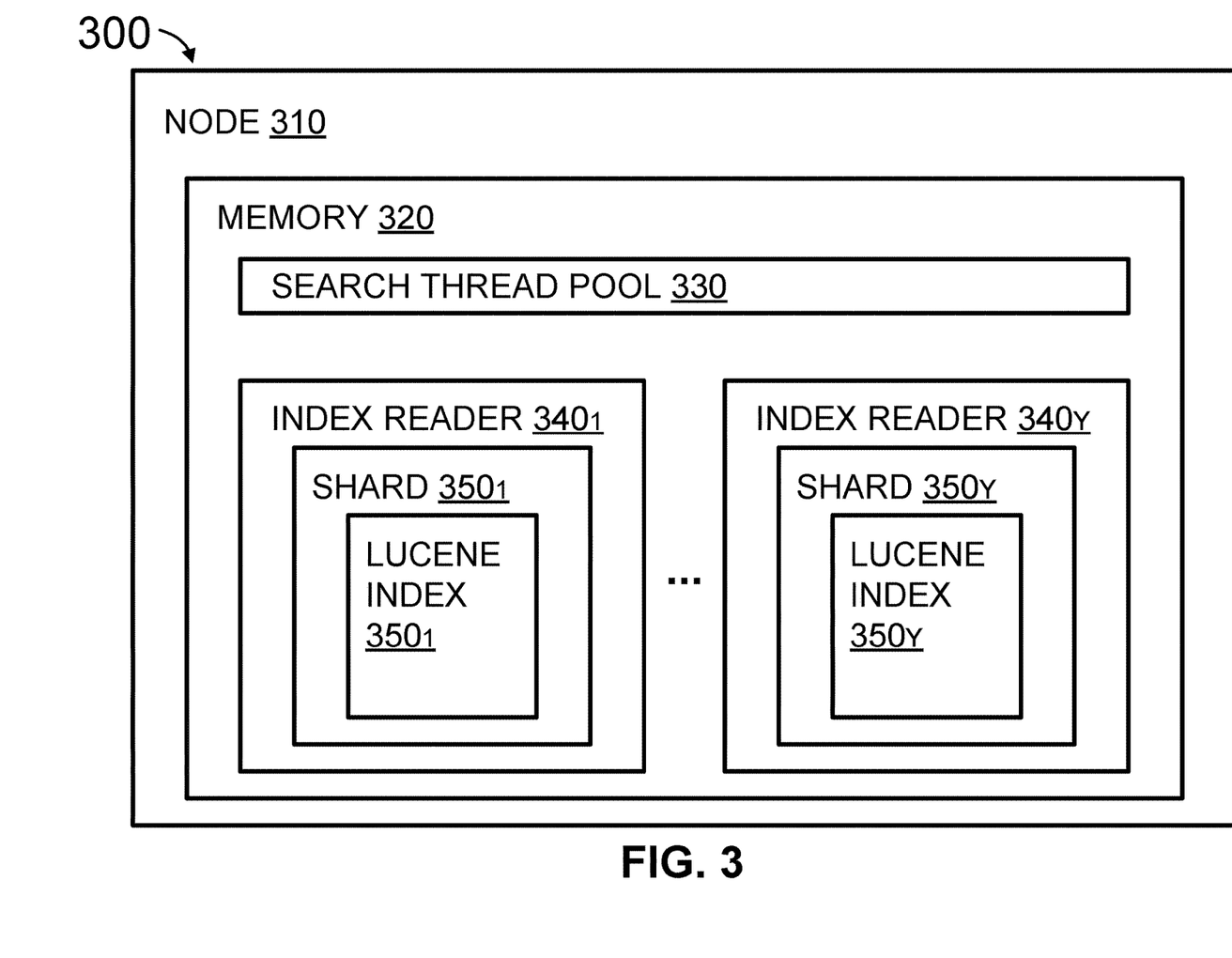
FIG. 3 is a simplified block diagram with a detailed view of a node with an open index, in accordance with some embodiments.

FIG. 3 illustrates node architecture 300, according to some embodiments. Node architecture 300 includes node 310. Node 310 (and its constituents) can have at least some of the characteristics of nodes 120$_1$-120$_X$ (FIG. 1), node client(s) 210, master node(s) 220, and data node(s) 230A (FIG. 2).

As described above, an index can be subdivided into multiple pieces called shards. Shards can be both a physical and logical division of an index. According to some embodiments, a shard includes a Lucene index. Lucene is an information retrieval software library and a Lucene index includes one or more documents. When an index is created, the number of shards can be specified. Each shard can in itself be a fully-functional and independent "index" that can be hosted on any node (e.g., data node(s) 230B, data nodes 230A (FIG. 2), and one or more nodes 120$_1$-120$_X$ (FIG. 1)) in the cluster (e.g., cluster 130A (FIG. 1) and cluster 130B (FIG. 2)).

For the purpose of illustration, node 310 stores one open index and the open index is subdivided into shards 350$_1$-350$_Y$. Any number of shards can be used, though. Node 310 can include memory 320. Memory 320 (e.g., memory 720 in FIG. 7) can store search thread pool 330 and index readers 340$_1$-340$_Y$. Search requests received by node 310 (for an open index) go to search thread pool 330. Search thread pool 330 may also be referred to herein as thread pool. Search thread pool 330 can be used to help manage memory consumption in node 310. Search thread pool 330 can include a (First-In-First-Out (FIFO)) queue, which holds pending requests. Index readers 340$_1$-340$_Y$ can provide read access to shards 350$_1$-350$_Y$ (respectively), which are also stored in memory 320. In other words, a shard can have one index reader and the index reader can have a one-to-one relationship with the Lucene index. Index readers can be an abstraction of a Lucene index in memory. Index readers 340$_1$-340$_Y$ allocate memory (e.g., heap space) for an index (or shards of the index).

Typically, a significant amount of memory (e.g., memory 320) must be available to keep an index open and searchable. For example, a 10 gigabyte index can easily consume 150 megabytes of memory. However, not all indices need to be readable at the same time and can have different access patterns over time. For example, an index can have time-based data for a metric that ages (e.g., is less likely to be searched) over time. According to some embodiments, there can be time-based indices where a new index (in a series of indices) is (automatically) created at a predetermined interval (e.g., hourly daily, weekly, monthly, annually, and the like).

By way of non-limiting example, for a time-based index in which a new index is rolled over to every twenty-four hours, the most recent three days' worth of data is frequently used (e.g., searched), but thirty days' worth of data maintained. This can be useful, for example, in security analytics applications. Here, an event or trend may be found in the last three days' worth of data, which leads to a search of the last thirty days' worth of data (e.g., to determine when the event or trend started). Yet, a search of the last thirty days' worth of data can be an exceptional situation (does not happen often). Millisecond search response times for the last thirty days' worth of data may not be needed and worth the additional resource costs, such as for storing the last thirty days' worth of data in memory (e.g., memory 720 in FIG. 7).

While indices storing time series or logging data are less likely to be searched once the indices "age out" (e.g., information is less likely to be searched as time goes by), but these indices are stored for retention policy reasons. While data can be archived (e.g., store the index in (disks of) a data store, such Amazon S3 (Amazon Simple Storage Service), Google Compute Engine, network attached storage (NAS), and the like) it can take a significant amount of time (e.g., on the order of hours to days) to transfer the index back to a node and then to search the index.

Frozen indices represent a tradeoff between the amount of memory used by an index and the amount of time it takes to search the index. For example, memory is only consumed by the frozen index when a query is received and the search takes longer (than it otherwise would for an index that is not frozen). Indices that are not frozen are referred to as open (e.g., open indices). By way of further example, a search of a frozen index is five times slower (than the same index when it is open) and uses a fifteenth of the memory (used by the same index when it open). In contrast, a frozen index can be searched orders of magnitude (e.g., $10^3$-$10^9$) faster than an archived index. To keep indices available and queryable while reducing hardware requirements (e.g., memory consumed), open indices can be transitioned to a frozen state.

Figure 4:
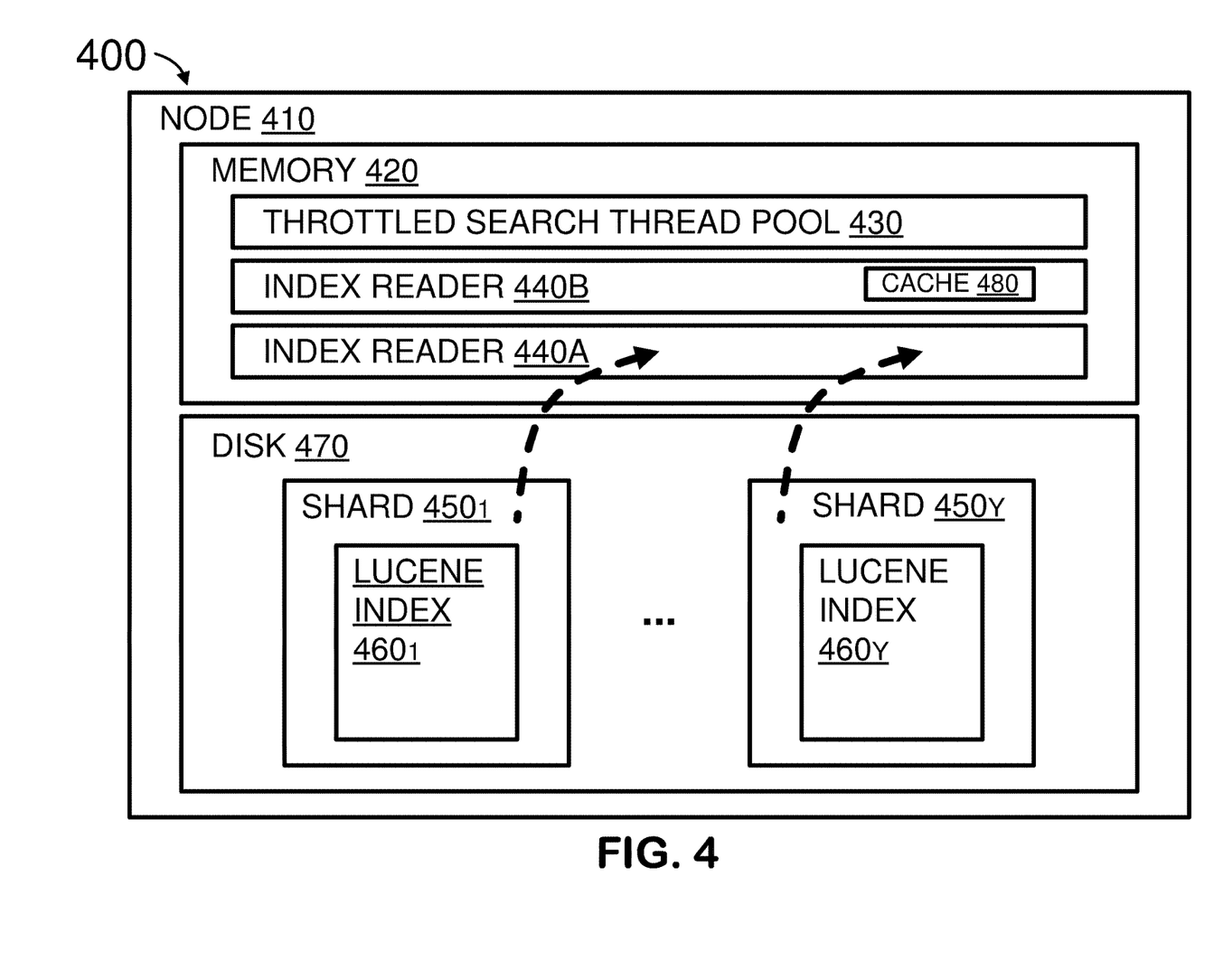
FIG. 4 is a simplified block diagram with a detailed view of a node with a frozen index, in accordance with various embodiments.

FIG. 4 illustrates node architecture 400, according to some embodiments. Node architecture 400 includes node 410. Node 410 (and its constituents) can have at least some of the characteristics of nodes $120_1$-$120_X$ (FIG. 1), node client(s) 210, master node(s) 220, and data node(s) 230A (FIG. 2). According to some embodiments, node 410 may have fewer resources (e.g., amount and/or speed of memory 720 (FIG. 7), number of processing cores and/or processor clock frequency of processor unit(s) 710, and the like) than a node which includes an open index (e.g., node 310 in FIG. 3). In this way, the number (and type) of resources available to frozen indices can be limited or capped.

Figure 7:
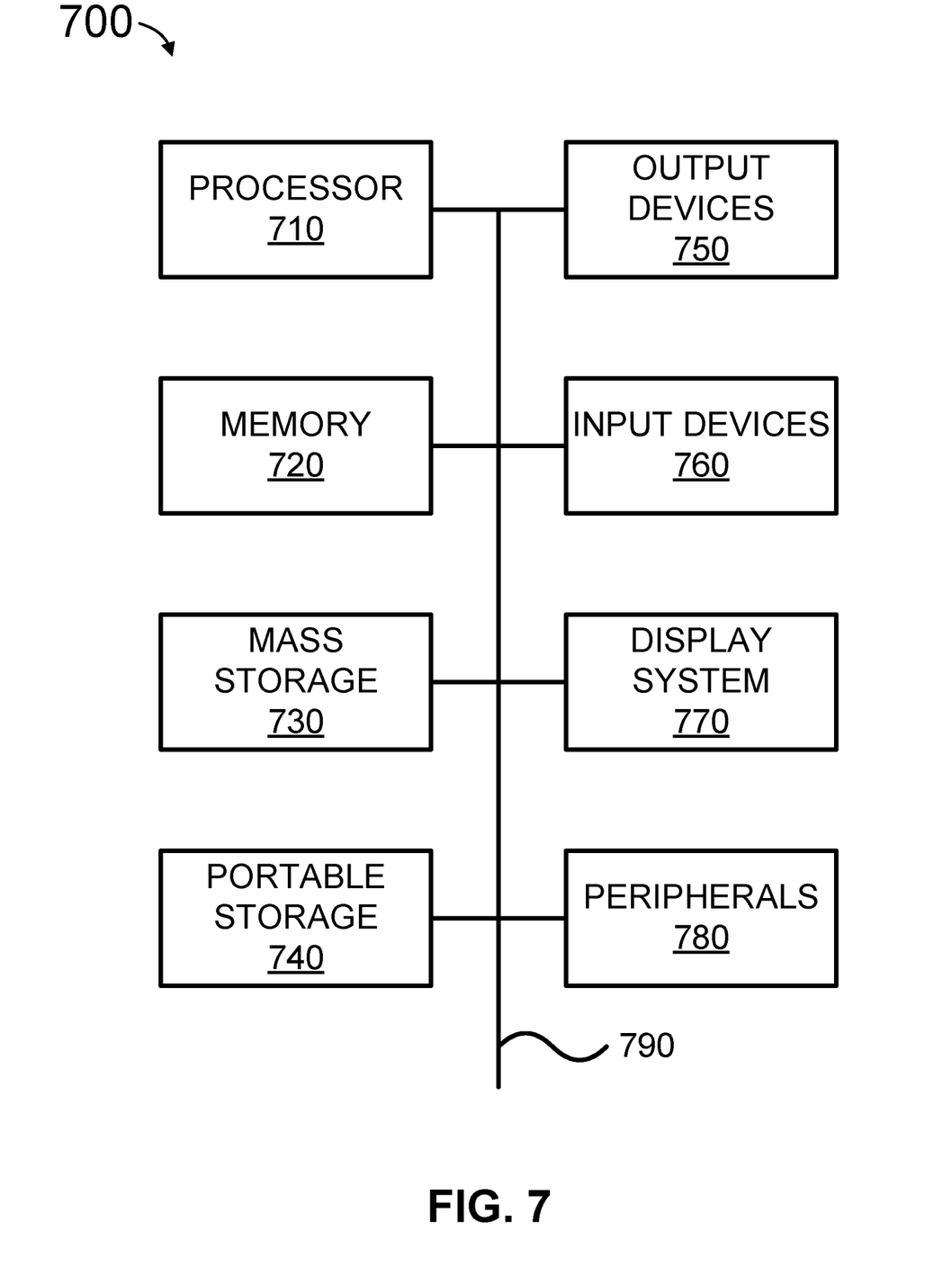
FIG. 7 is a simplified block diagram of a computing system, in accordance with some embodiments.

To transition an open index to a frozen state, the open index (e.g., comprised of shards $350_1$-$350_Y$ in FIG. 3) is removed from memory (e.g., memory 320) and stored on disk 470 (e.g., mass storage 730 in FIG. 7). The frozen index stored on disk 470 can be loaded back into memory 420 for searches. For the purpose of illustration, node 410 stores one frozen index and the index is subdivided into shards $450_1$-$450_Y$. Any number of shards can be used, however.

Node 410 can include memory 420 and disk 470. Disk 470 can store shards $450_1$-$450_Y$. Shards $450_1$-$450_Y$ can include Lucene indices $460_1$-$460_Y$, respectively. Memory 420 (e.g., memory 720 in FIG. 7) can store search throttled thread pool 430, index reader 440A, and special index reader 440B.

Search requests received by node 410 (for a frozen index) go to search throttled thread pool 430. Search throttled thread pool 430 may also be referred to herein as throttled thread pool. Search throttled thread pool 430 can be used to help manage memory consumption in node 410. Search throttled thread pool 430 can include a (First-In-First-Out (FIFO)) queue, which holds pending search requests. Index reader 440A can be instantiated/created to provide read access as needed to shards $450_1$-$450_Y$ (respectively), which are also stored in memory 420. Index reader 440A is only instantiated/created (for a shard, such as one of shards $450_1$-$450_Y$) when a query for a frozen index (which includes shards $450_1$-$450_Y$) is received. Index reader 440A can differ from index reader 340 (FIG. 3). For example, index reader 440A will not fill up any caches, because cache hits will typically not occur.

After a search query advances through a queue of search throttled thread pool 430 and when it is to be executed, an instance of index reader 440A is created for the search query and the shard (of the frozen index) to be searched (e.g., shards $450_1$-$450_Y$) is loaded from disk 470 into memory 420 (unless the shard is already present in memory 420). The search query is executed. When the search is completed, the instance of reader 440A and the now searched shard can be flushed/removed from memory 420. The next search query in the queue of search throttled thread pool 430 (if there is one) can then be (similarly) executed.

Search throttled thread pool 430 can be used to ensure that for a search query there is not more than one (or other configurable number) frozen index shard allocated in memory concurrently on a node at a time. In other words, search throttled thread pool 430 "throttles" searches by limiting the number of concurrent search requests in memory on a node at a time. By way of non-limiting example, if there are four shards and two nodes, where each node holds two shards, then a search of all four shards will have searches performed on two of the shards in parallel, one on each node. On each node, searching (execution) is throttled by the throttled thread pool. The throttled thread pool can have one thread by default, so searches can be performed sequentially (e.g., on a node with two shards, the two shards are searched one after the other). For example, where a node can hold (has enough memory to hold) two shards in memory (e.g., memory 720 in FIG. 7), then you can configure the number of concurrent frozen shards in memory to two.

In some embodiments, one node includes multiple frozen indices and frozen indices are not located in the same node with open indices. According to various embodiments, frozen indices can be located in the same node as open indices. For example, an index is transitioned to a frozen state on the node where it was previously open and then the frozen index is relocated to another node.

According to some embodiments, node 410 can perform a pre-check of a frozen index (or constituent shard(s) of the frozen index) before executing an actual search (e.g., instantiating index reader 440A, loading a shard to be searched into memory 420, performing the search, providing a search result, flushing memory 420, etc.). The pre-check can determine whether a document could possibly be in the frozen index (or constituent shard(s) of the frozen index). When the answer is yes, then it is possible that the document is in the frozen index (or constituent shard(s) of the index) and should be searched. When the answer is no, then it is not possible for the document to be in the frozen index (or constituent shard(s) of the frozen index) and a search should not be performed.

For example, a search request can be for documents in a series of time-based frozen indices starting in the present (now) and going back two days (minus two days). At least some of the time-based frozen indices (or constituent shard(s) of the time-based frozen indices) that are being searched cannot possibly match, because they do not have any documents in the search time frame (e.g., these time-based frozen indices only contain documents older than two days).

The pre-check can determine whether the time-based frozen index can possibly match (e.g., contain documents within the search time frame) based on the time frame and without loading the entire time-based frozen index (or constituent shard(s) of the time-based frozen index) into memory. Once time-based frozen indices (or constituent shard(s) of the time-based frozen indices)—which possibly contain documents in the search time frame—are identified using the pre-check, then those time-based frozen indices can be searched. For efficiency, the time-based frozen indices (or constituent shard(s) of the time-based frozen indices) which fall outside of the search time frame are not searched. The pre-check (phase) can be referred to as the "can match" phase.

In some embodiments, when shards (e.g., of a time-based index) are allocated on node 410, a source reader (not shown in FIG. 4) is instantiated (e.g., when the shard starts up). The source reader fetches only the bounds (e.g., minimum and maximum field values, which can be eight bytes each per field)—not the entire field—for all numeric fields of the frozen index (or constituent shard(s) of the frozen index). The bounds can then be stored in cache 480, which consumes very little memory (e.g., bounds for one thousand numeric fields would only use sixteen-thousand bytes of memory). The source reader is then closed (e.g., removed from memory 420). Index reader 440B—which consumes very little memory—is maintained in memory to search cache 480.

Index reader 440B can read cache 480. During a "can match" phase, the coordinating node (FIG. 2) can checks the (e.g., time-based) indices (or constituent shard(s) of the (e.g., time-based) indices) to see if they have documents within the search time frame. Index reader 440B compares the search time frame to the bounds in cache 480. When the search time frame is within (or at least overlaps with) the bounds, then node 410 signals to the coordinating node that the (e.g., time-based) indices (or constituent shard(s) of the time-based indices) are to be searched. When the search time frame is not within (or does not overlap with) the bounds, then node 410 signals to the coordinating node that the time-based indices (or constituent shard (s) of the time-based indices) are not to be searched. Alternatively or additionally, the pre-check can check for a match in other numeric fields or metadata in cache 480. The pre-check can go to index reader 440B without going through throttled search thread pool 430.

Depending on the operating system running on node 410, searching frozen indices can be incredibly fast. For example, if a frozen index (or constituent shard(s) of the frozen index) is loaded once and is in the file system cache, opening reader 440A and loading the frozen index (or constituent shard(s) of the frozen index) can occur blazingly fast (e.g., the storage systems can transfer a terabyte per second on a PCI Express bus).

Figure 5:
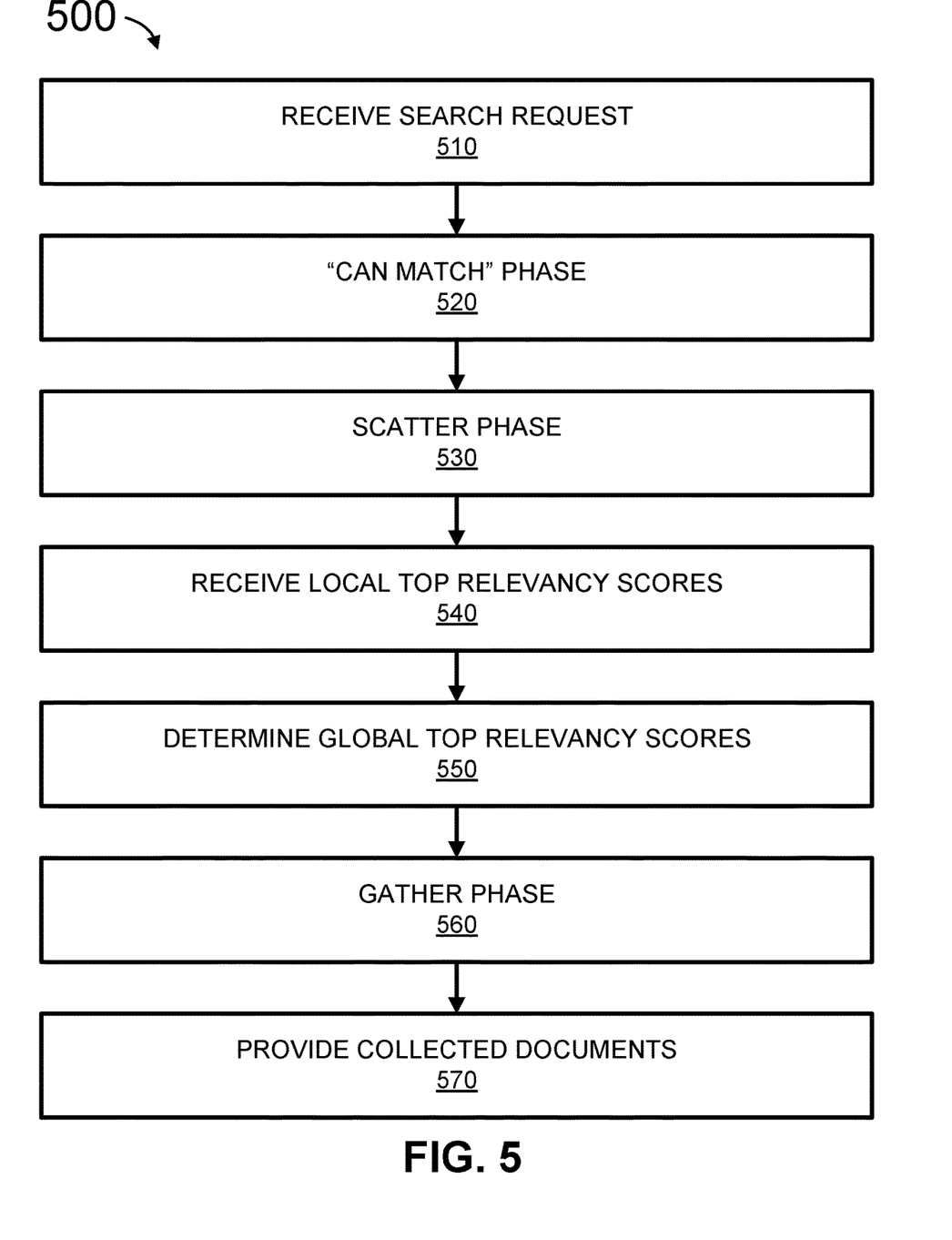
FIG. 5 is a simplified flow diagram of a method for searching a distributed frozen index, according to some embodiments.

FIG. 5 shows method 500 for a searching a distributed frozen index according to some embodiments. Method 500 can be performed by a coordinating node (FIG. 2). Method 500 can commence at step 510 where a search request for a frozen index (e.g., the index is marked a frozen) can be received.

At step 520, a request to pre-check shards (e.g., shard $450_1$-$450_Y$ in FIG. 4) during a "can match" phase can be sent to multiple nodes (e.g., of node 410). Also at step 520, responses indicating a match (e.g., documents in the shard(s) are within or at least overlap with a search time frame) and/or no match (e.g., documents in the shard(s) are not within or do not overlap with a search time frame) can be received from the multiple nodes during the "can match" phase. In addition, nodes returning a match during the "can match" phase can be identified for performing the search.

At step 530, a search request can be sent to the nodes identified for performing the search during a scatter phase. At step 540, top local (e.g., from the nodes) (relevancy) scores (associated with documents) are received from the nodes. At step 550, the top scores (associated with documents) from all the nodes are sorted and reduced to the global (from across the nodes) top scores (associated with documents). At step 560, the documents associated with the top scores from across the nodes are collected from their respective nodes during a gather phase. At step 570, the retrieved documents are provided in response to the search request.

Figure 6:
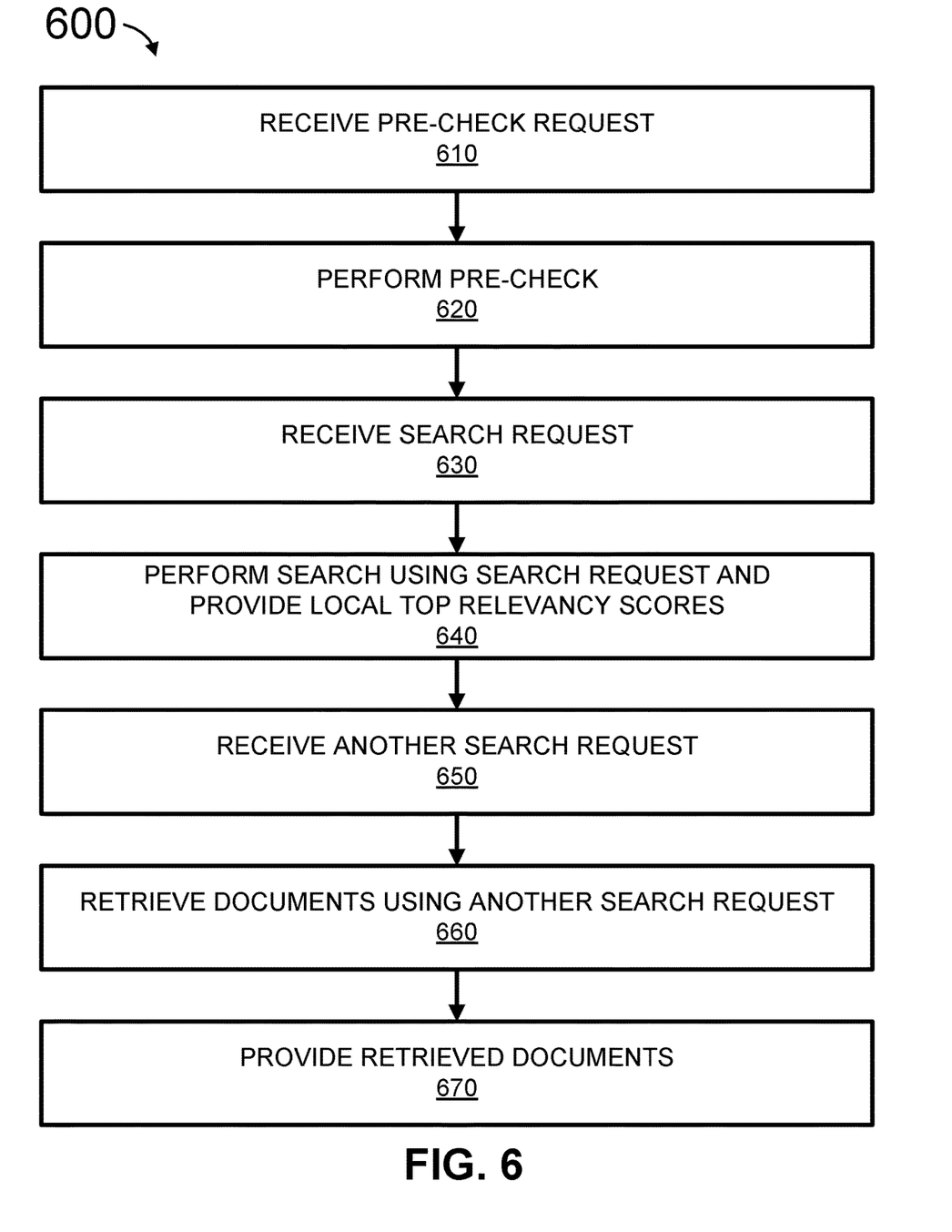
FIG. 6 is a simplified flow diagram of a method for searching a frozen index in a node, according to various embodiments.

FIG. 6 illustrates a method 600 for searching a frozen index in a node, in accordance with some embodiments. Method 600 can be performed by node 410 (FIG. 4). Method 600 can commence at step 610 where a pre-check request can be received. For example, the pre-check request can be from a coordinating node (FIG. 2) during a "can match" phase.

At step 620, the pre-check can be performed. For example, a search time frame specified in the pre-check request can be compared to bounds of the index or shard. In some embodiments, reader 440B (FIG. 4) gets the bounds from cache 480. When the bounds fall within or at least overlap with the search time frame (and vice-versa), a match indication can be returned to the coordinating node during the "can match" phase. When the bounds do not fall within or overlap with the search time frame (and vice-versa), a no match indication can be returned to the coordinating node, during the "can match" phase.

At step 630 (when a match indication was returned to the coordinating node), a search request is received from the coordinating node during a scatter phase. At step 640, the search is performed and top relevancy scores (associated with documents) are returned to the coordinating node (FIG. 2) during the scatter phase. For example, the search request goes through a queue of a search throttled thread pool (e.g., search throttled thread pool 430 in FIG. 4), an index reader (e.g., index reader 440A) is instantiated, a shard (e.g., of shards $450_1$-$450_Y$ in FIG. 4) is loaded from disk (e.g., disk 470) into memory 420, the search is performed, the top documents and their corresponding scores are collected and ranked, and the index reader and shard are flushed from memory 420. The collected and ranked top documents and their corresponding scores can be provided to the coordinating node.

At step 650, another search request is received from the coordinating node during a gather phase. At step 660, the search is performed and top documents across the nodes from the prior search are retrieved. For example, the search request goes through a queue of a search throttled thread pool (e.g., search throttled thread pool 430 in FIG. 4), an index reader (e.g., index reader 440A) is instantiated, a shard (e.g., of shards $450_1$-$450_Y$ in FIG. 4) is loaded from disk (e.g., disk 470) into memory 420, the search is performed, the top documents across the nodes from the prior search are retrieved, and the index reader and shard are flushed from memory 420. At step 670, the retrieved documents can be provided to the coordinating node.

At steps 640 and 660, the shard is loaded from disk into memory each time. At steps 640 and 660, "same point in time" snapshot of the shard is read. In other words, same point in time snapshot of an index is used at steps 640 and 660. For an open index (FIG. 3), a search index reader (e.g., search index reader $340_1$-$340_Y$) is always open and can make sure the same point in time snapshot of the shard is searched. However, a frozen index closes the reader and clears the memory when the search is done. For a frozen index, frozen engine (e.g., in memory 420 (FIG. 4)) can be used to make sure that the same point in time snapshot is read at steps 640 and 660.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

Some of the components provided in the computer system 700 in FIG. 7 can be those typically found in computer systems that may be suitable for use with embodiments of the present disclosure and are intended to represent a broad category of such computer components. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for searching a frozen index comprising:
   receiving an initial search and a subsequent search;
   loading the initial search and the subsequent search into a throttled thread pool, the throttled thread pool including a first-in first-out queue;
   getting the initial search from the throttled thread pool;
   storing a first shard from a mass storage in a memory in response to the initial search;
   performing the initial search on the first shard;
   providing first top search result scores from the initial search;
   removing the first shard from the memory when the initial search is completed;
   getting the subsequent search from the throttled thread pool;
   storing a second shard from the mass storage in the memory in response to the subsequent search;
   performing the subsequent search on the second shard;
   providing second top search result scores from the subsequent search; and
   removing the second shard from memory when the subsequent search is completed.

2. The computer-implemented method of claim 1, wherein a first index and a second index are constituents of the frozen index, the frozen index is a collection of documents, and the documents include one or more of time series and logging data.

3. The computer-implemented method of claim 2, wherein the frozen index is an Elasticsearch index.

4. The computer-implemented method of claim 3, wherein the first index and the second index each include a respective Lucene index.

5. The computer-implemented method of claim 1 further comprising:
   receiving a pre-check request, the pre-check request including a search time frame; and
   determining there is a match between the search time frame and the first index, the match being determined using a cache, the match being when at least one document in the first index is within the search time frame, the cache including minimum and maximum time values of the first index,
   wherein the initial search is received in response to the match.

6. The computer-implemented method of claim 5 further comprising:

receiving another pre-check request, the another pre-check request including another search time frame; and
determining there is a second match between the another search time frame and the second index, the second match being determined using the cache, the second match being when at least one document in the second index is within the search time frame, the cache including minimum and maximum time values of the second index,
wherein the subsequent search is received in response to the second match.

7. The computer-implemented method of claim 1, further comprising:
receiving a third search request, the third search request being based on the first top search result scores;
retrieving documents from a pre-stored snapshot of the first shard based on the third search request; and
providing the retrieved documents,
wherein the storing the first shard stores the snapshot of the first shard.

8. The computer-implemented method of claim 7, further comprising:
receiving a fourth search request, the fourth search request being based on the second top search result scores;
storing a snapshot of the second shard from the mass storage in the memory in response to the fourth search request;
retrieving second documents from the snapshot of the second shard based on the fourth search request; and
providing the retrieved second documents,
wherein the storing the second shard stores the snapshot of the second shard.

9. The computer-implemented method of claim 1, wherein the memory is constituent of one or more of a virtual machine, container, and physical computing system.

10. The computer-implemented method of claim 1, wherein the mass storage is one or more of a magnetic disk drive, solid state drive, and an optical disk drive.

11. A system for searching a frozen index, the system comprising:
a processor; and
a memory communicatively coupled to the processor, the memory storing instructions executable by the processor to perform a method comprising:
receiving an initial search and a subsequent search;
loading the initial search and the subsequent search into a throttled thread pool, the throttled thread pool including a first-in first-out queue;
getting the initial search from the throttled thread pool;
storing a first shard from a mass storage in a memory in response to the initial search;
performing the initial search on the first shard;
providing first top search result scores from the initial search;
removing the first shard from the memory when the initial search is completed;
getting the subsequent search from the throttled thread pool;
storing a second shard from the mass storage in the memory in response to the subsequent search;
performing the subsequent search on the second shard;
providing second top search result scores from the subsequent search; and
removing the second shard from memory when the subsequent search is completed.

12. The system of claim 11, wherein a first index and a second index are constituents of the frozen index, the frozen index is a collection of documents, and the documents include one or more of time series and logging data.

13. The system of claim 12, wherein the frozen index is an Elasticsearch index.

14. The system of claim 13, wherein the first index and the second index each include a respective Lucene index.

15. The system of claim 11, wherein the method further comprises:
receiving a pre-check request, the pre-check request including a search time frame; and
determining there is a match between the search time frame and the first index, the match being determined using a cache, the match being when at least one document in the first index is within the search time frame, the cache including minimum and maximum time values of the first index,
wherein the initial search is received in response to the match.

16. The system of claim 15, wherein the method further comprises:
receiving another pre-check request, the another pre-check request including another search time frame; and
determining there is a second match between the another search time frame and the second index, the second match being determined using the cache, the second match being when at least one document in the second index is within the search time frame, the cache including minimum and maximum time values of the second index,
wherein the subsequent search is received in response to the second match.

17. The system of claim 11, wherein the method further comprises:
receiving a third search request, the third search request being based on the first top search result scores;
retrieving documents from a pre-stored snapshot of the first shard based on the third search request; and
providing the retrieved documents,
wherein the storing the first shard stores the snapshot of the first shard.

18. The system of claim 17, wherein the method further comprises:
receiving a fourth search request, the fourth search request being based on the second top search result scores;
storing a snapshot of the second shard from the mass storage in the memory in response to the fourth search request;
retrieving second documents from the snapshot of the second shard based on the fourth search request; and
providing the retrieved second documents,
wherein the storing the second shard stores the snapshot of the second shard.

19. The system of claim 11, wherein the memory is constituent of one or more of a virtual machine, container, and physical computing system.

20. A system for searching a frozen index, the system comprising:
means for receiving an initial search and a subsequent search;
means for loading the initial search and the subsequent search into a throttled thread pool, the throttled thread pool including a first-in first-out queue;
means for getting the initial search from the throttled thread pool;
means for storing a first shard from a mass storage in a memory in response to the initial search;
means for performing the initial on the first shard;

means for providing first top search result scores from the initial search;

means for removing the first shard from the memory when the initial search is completed;

means for getting the subsequent search from the throttled thread pool;

means for storing a second shard from the mass storage in the memory in response to the subsequent search;

means for performing the subsequent search on the second shard;

means for providing second top search result scores from the subsequent search; and means for removing the second shard from memory when the subsequent search is completed.

\* \* \* \* \*